United States Patent
Shiota et al.

(10) Patent No.: US 7,138,169 B2
(45) Date of Patent: Nov. 21, 2006

(54) CLOTH-LIKE POLYMERIC FILM WITH DIRECTIONAL TEAR

(75) Inventors: Ko Shiota, Kawasaki (JP); Joel A. Getschel, Osceola, WI (US); Mark A. Strobel, Maplewood, MN (US); Michael J. Ulsh, Woodbury, MN (US); Terry R. Ray, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/382,147

(22) Filed: Mar. 5, 2003

(65) Prior Publication Data

US 2004/0175527 A1    Sep. 9, 2004

(51) Int. Cl.
*B32B 3/24* (2006.01)
*B32B 7/12* (2006.01)

(52) U.S. Cl. .................. 428/134; 428/43; 428/136; 493/963; 493/342

(58) Field of Classification Search ................ 428/43, 428/134, 136; 493/963, 342
See application file for complete search history.

(56) References Cited

U.S. PATENT DOCUMENTS

| | | |
|---|---|---|
| 2,687,978 A | 8/1954 | Vogt |
| 3,038,198 A | 6/1962 | Schaar |
| 3,394,211 A | 7/1968 | MacDuff |
| 3,467,250 A | 9/1969 | Delia et al. |
| 3,649,431 A | 3/1972 | Parker |
| 3,985,600 A | 10/1976 | Blais |
| 4,015,917 A | 4/1977 | Ericson |
| 4,217,327 A | 8/1980 | Cancio et al. |
| 4,248,822 A | 2/1981 | Schmidt |
| 4,330,499 A | 5/1982 | von und zu Aufsess et al. |
| 4,451,533 A | 5/1984 | Wong et al. |
| 4,522,854 A | 6/1985 | Sharps, Jr. |
| 4,581,087 A | 4/1986 | Johnson |
| 4,587,175 A | 5/1986 | Akao |
| 4,595,738 A | 6/1986 | Hufnagel et al. |

(Continued)

FOREIGN PATENT DOCUMENTS

EP    0 418 773 A2    3/1991

(Continued)

OTHER PUBLICATIONS

U.S. Appl. No. 10/267,538, filed Oct. 9, 2002, An Apparatus for Flame-Perforating Films and Methods of Flame-Perforating Films.

*Primary Examiner*—William P. Watkins, III
(74) *Attorney, Agent, or Firm*—David B. Patchett

(57) ABSTRACT

A polymeric film having a plurality of perforations, which are specially structured and arranged is described. The polymeric film provides a strong, high-tensile strength material that permits hand tearing of the film along a desired tear path, providing a controlled tear propagation line. The polymeric film may also be incorporated into a multi-layer film having cloth-like properties of strength and tear propagation, and is suitable for use various adhesive tape applications. Methods of making the polymeric film are also disclosed.

31 Claims, 7 Drawing Sheets

U.S. PATENT DOCUMENTS

| | | |
|---|---|---|
| 4,609,107 A | 9/1986 | Martin et al. |
| 4,675,582 A | 6/1987 | Hommes et al. |
| 4,825,111 A | 4/1989 | Hommes et al. |
| 4,853,602 A | 8/1989 | Hommes et al. |
| 4,978,486 A | 12/1990 | Ito et al. |
| 5,036,262 A | 7/1991 | Schonbach |
| 5,051,225 A | 9/1991 | Hommes et al. |
| 5,072,493 A | 12/1991 | Hommes et al. |
| 5,141,795 A | 8/1992 | Kai et al. |
| 5,198,276 A * | 3/1993 | Nakajima .................... 428/43 |
| 5,212,011 A | 5/1993 | Ishikawa et al. |
| 5,536,555 A | 7/1996 | Zelazoski et al. |
| 5,560,966 A | 10/1996 | Kishimoto et al. |
| 5,637,368 A | 6/1997 | Cadalbert et al. |
| 5,648,142 A | 7/1997 | Phillips |
| 5,830,555 A | 11/1998 | Srinivasan et al. |
| 6,228,485 B1 | 5/2001 | Leiter |

FOREIGN PATENT DOCUMENTS

| | | |
|---|---|---|
| GB | 851053 | 10/1960 |
| GB | 851473 | 10/1960 |
| GB | 1 012 963 | 12/1965 |
| GB | 1 073 605 | 7/1967 |
| GB | 2 214 450 A | 9/1989 |
| GB | 2 313 338 A | 11/1997 |
| WO | WO 9506450 | 3/1995 |
| WO | WO 96/24549 | 8/1996 |
| WO | WO 02/11978 A1 | 2/2003 |

* cited by examiner

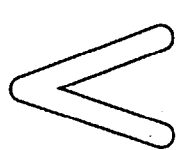
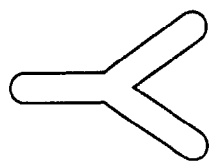
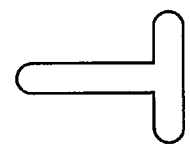
*Fig. 7*　　　*Fig. 8*　　　*Fig. 9*
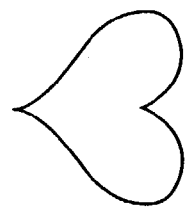
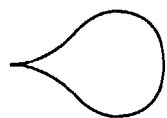
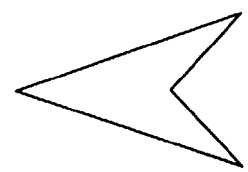
*Fig. 10*　　　*Fig. 11*　　　*Fig. 12*
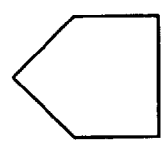
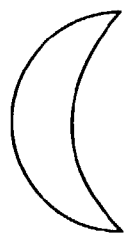
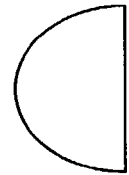
*Fig. 13*　　　*Fig. 14*　　　*Fig. 15*
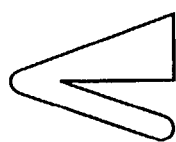
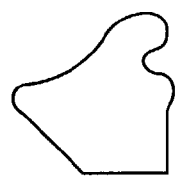
*Fig. 16*　　　*Fig. 17*

CLOTH-LIKE POLYMERIC FILM WITH DIRECTIONAL TEAR

TECHNICAL FIELD

The present invention relates to cloth-like polymeric films and products made therefrom, including polymeric backings for adhesive tapes. More specifically the present invention relates to a readily hand-tearable polymeric film with specially structured and aligned perforations for the directional control of the tear.

BACKGROUND OF THE INVENTION

Adhesive tapes containing a woven cloth backing are widely used, such as in conventional duct tapes sold to consumers and professionals. One of the advantages of using woven cloth as a tape backing is that it provides a combination of high tensile strength and low elongation to break in both the length or machine direction ("MD") of the tape and in the width or transverse direction ("TD") of the tape. For many applications, this high strength and low elongation can be very important. Another advantage provided by tape backings is the relative ease of straight-line tearing along each of these two principle directions. Woven cloth backings also have drape and conformability characteristics that are desirable in many tape applications, and provide an appearance that is considered desirable in the marketplace for many kinds of adhesive tapes that have traditionally been made with woven cloth backings.

Woven cloth also has several disadvantages as an adhesive tape backing. In many applications, the woven structure must be saturated by the adhesive used in the tape, leading to the use of larger amounts of adhesive than for a film-backed tape. In some applications, a smooth or non-fibrillar top surface of the tape is desired, so the cloth backing must be overlaminated or coated. Also, hand-tearing cloth-backed tapes frequently results in loose fibers protruding from one or both torn edges. Finally, cloth backings are generally more expensive than polymeric film backings.

A polymeric film suitable for use as a backing material for tapes, as well as for use in other applications that require high tensile strength and straight-line tearing, is described in WO 200211978A, entitled "Cloth-like Polymeric Films." The film in WO '978 has a plurality of elongate oval perforations configured and arranged in a manner such that the film exhibits many of the properties of cloth materials. U.S. Pat. No. 4,609,107 by Martin et al. describes a line of specially shaped, closely spaced apart perforations that provide a controlled tear line for an easy-open plastic bag used to package snack foods. Tear-inducing cuts and apertures in the shape of straight slits, circular holes, "L"-shaped, "V"-shaped or "U"-shaped cuts along the length (MD) of a packaging tape are described in WO 96/24549. Corrugated thermoplastic articles comprising at least two uniaxially oriented sheets of crystalline polymer and methods for preparing such sheets are described in U.S. Pat. No. 3,649,431 by Parker. To form the corrugated construction of Parker, the multiple sheets are fusion bonded at the peripheries of closely spaced perforations. For particular applications, a desire still exists for an alternative polymer film tape backing that combines, at low cost, the strength, elongation, tear, and conformability properties of woven fabric and provides a less jagged, tear line along a desired tear path, while maintaining tensile strength in a direction perpendicular to the tear line.

SUMMARY OF THE INVENTION

The present invention is directed to a polymeric film suitable for use as a backing material for tapes, as well as for use in other applications that require high tensile strength and hand tearing along a desired tear path. The polymeric film has a plurality of perforations structured and arranged in a manner such that the film exhibits many of the properties of cloth materials. The structure and arrangement of the perforations provide a film that can be readily torn along a desired tear path, yet has a sufficient tensile strength to be used in adhesive tape applications.

One aspect of the invention provides a polymeric film comprising a plurality of perforations, arranged in a desired tear path. Each perforation defines an open area having a raised ridge at the boundary. The perforation has a shape comprising two ends, a narrow end and a wide end opposite the narrow end. The plurality of perforations are arranged to accomplish a very predictable tear along a desired tear path. The desired tear path extends through a central portion of the wide end and through the narrow end of each perforation. The narrow end of one perforation is proximal to the wide end of an adjacent perforation, along the same desired tear path. The perforated film provides improved tearing properties, while maintaining tensile strength. The desired tear path defined by the arrangement of the perforations can be a substantially straight or curved line of perforations and in the case of a straight line may be perpendicular to one side edge of the film. Some embodiments may also include multiple desired tear paths.

In some embodiments, the perforations in the polymeric film have a length, which is greater than or equal to the distance between adjacent perforations in the same desired tear path. Additionally, in some embodiments, the length is also typically greater than the width of the perforation and the width is also typically greater than the distance between adjacent perforations in the same desired tear path. When the pattern of the plurality of perforations comprises multiple desired tear paths, the multiple tear paths may be arranged in rows of perforations. In some embodiments it is advantageous if the gap between rows of perforations is greater than or equal to the space between perforations within the same row. It may also be preferred for some embodiments that the gap between rows of perforations is less than or equal to the width at the widest end of the perforations.

The invention is also directed to a method of making a perforated polymeric film. The method includes providing a polymeric film and perforating that film to form a plurality of perforations arranged in a desired tear path. Each perforation defining an open area specially shaped and structured with a raised ridge. Each perforation also has two ends, a narrow end and an opposite wide end. The plurality of perforations is arranged along a desired tear path. The desired tear path extends through a series of perforations at the central portion of the wide end and through the narrow end of each perforation. The perforations are arranged perforations such that the narrow end of one perforation is proximal to the wide end of an adjacent perforation, along the same desired tear path.

The above summary of the present invention is not intended to describe each discussed embodiment of the present invention.

BRIEF DESCRIPTION OF THE DRAWINGS

The present invention will be further explained with reference to the appended Figures, wherein the Figures are not to scale, wherein like structure is referred to by like numerals throughout the several views, and wherein:

FIGS. 7–17 are enlarged views of perforation shapes in accordance with an embodiment of the invention.

DETAILED DESCRIPTION OF THE INVENTION

The present invention is directed to an improved polymeric film, and in particular a cloth-like polymeric film. The polymeric film typically includes at least one polymeric layer having a plurality of perforations. These perforations are shaped and arranged in a fashion such that they promote easy hand tearing of the film along a directed path, for example in the transverse direction (TD). The perforations sufficiently preserve the tensile strength of the film while promoting hand tearability along a desired tear path, such that the film is suitable as a tape backing.

In one embodiment, the perforations may be an isosceles triangle in shape. However, more generally the perforations are shaped with one narrow end, from which a tear propagates, and an opposite wide end, shaped to intercept the tear propagating from the narrow end of an adjacent perforation. The perforations are arranged in a fashion such that the narrow end of each perforation is proximal to the wide end of the adjacent perforation in the tear propagation path, such that the perforations all point in the same direction as the desired tear propagation path along a defined tear axis. The base or wide end of each perforation is substantially centered on the defined tear axis. This perforated polymeric film can be joined to one or more additional layers or films, such as a top layer to provide durability or impermeability, or a bottom layer to provide adhesiveness.

Figure 1:
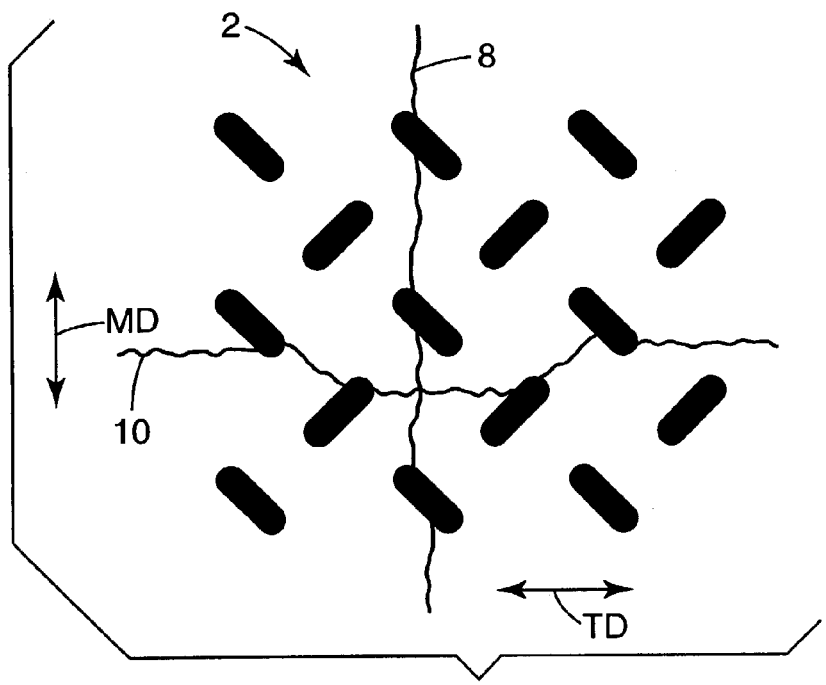
FIG. 1 is an elevated view of a pattern of perforations known in the art.

FIG. 1 shows a representation of a film perforation pattern 2 according to WO 200211978A, entitled "Cloth-like Polymeric Films." FIG. 1 includes numerous perforations, each of which is generally oval shaped and has a length greater than the width. The rows and columns of perforations are oriented at angles of approximately 45 degrees to the MD and TD and adjacent rows of perforations are oriented at opposed angles. This perforation pattern provides relatively straight MD tear line 8 and TD tear line 10.

Figure 2:
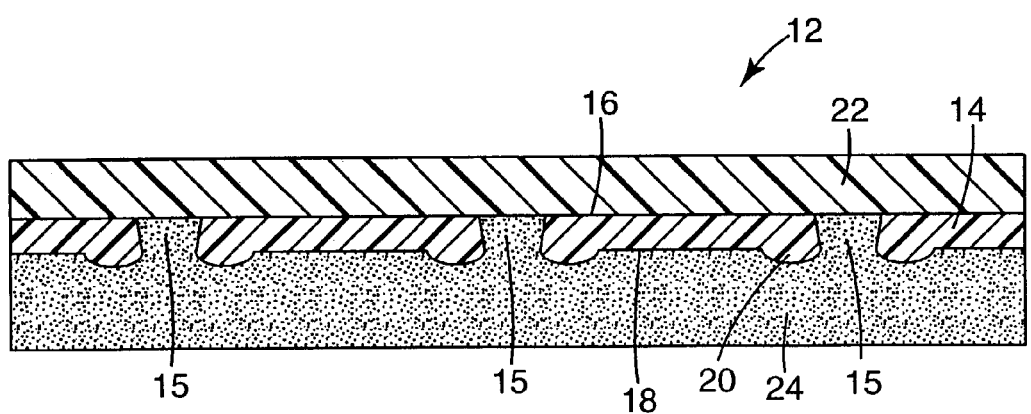
FIG. 2 is a cross-sectional representation of a multilayer polymeric film made in accordance with an embodiment of the invention.

FIG. 2 shows a representation of a cross section of a composite polymeric tape 12 produced in accordance with the invention using a perforated film as a tape backing material. Polymeric tape 12 contains a perforated film 14 having first major surface 16 and second major surface 18. Perforated film 14 contains perforations 15 extending through its thickness. In the embodiment depicted, the edges of each perforation 15 along second major surface 18 include raised portion 20, around each perforation. This raised portion 20, which may also be described as a raised ridge or rim, consists of polymer material from the interior of the perforation that has contracted upon melting and release of its orientation energy, which forms a rim around the periphery of the perforation. Such a rim may be continuous around the edge of the perforation. In some embodiments this raised portion 20 may be of substantially uniform thickness around each perforation. This ridge has been observed to provide enhanced tear properties of the perforated film. The raised ridge can also impart slight textures that cause the film to more closely resemble a cloth material. Perforated film 14 is typically an oriented film, for example a biaxially oriented film.

In the embodiment shown in FIG. 2, the polymeric tape 12 further includes a top film 22 and a bottom film 24. In the embodiment shown, top film 22 provides durability to the polymeric tape 12, and can further increase the strength and impart fluid impermeability to tape 12. Bottom film 24 is, for example, an adhesive composition. Additional or alternative layers can be used to create tape 12. The arrangement of the layers can also be changed. Thus, for example, the adhesive can be applied directly to the top film 22 rather than to the perforated layer.

The various materials and methods used for making perforated polymeric films in accordance with the invention will now be discussed in greater detail.

A. Perforation Patterns

Figure 3:
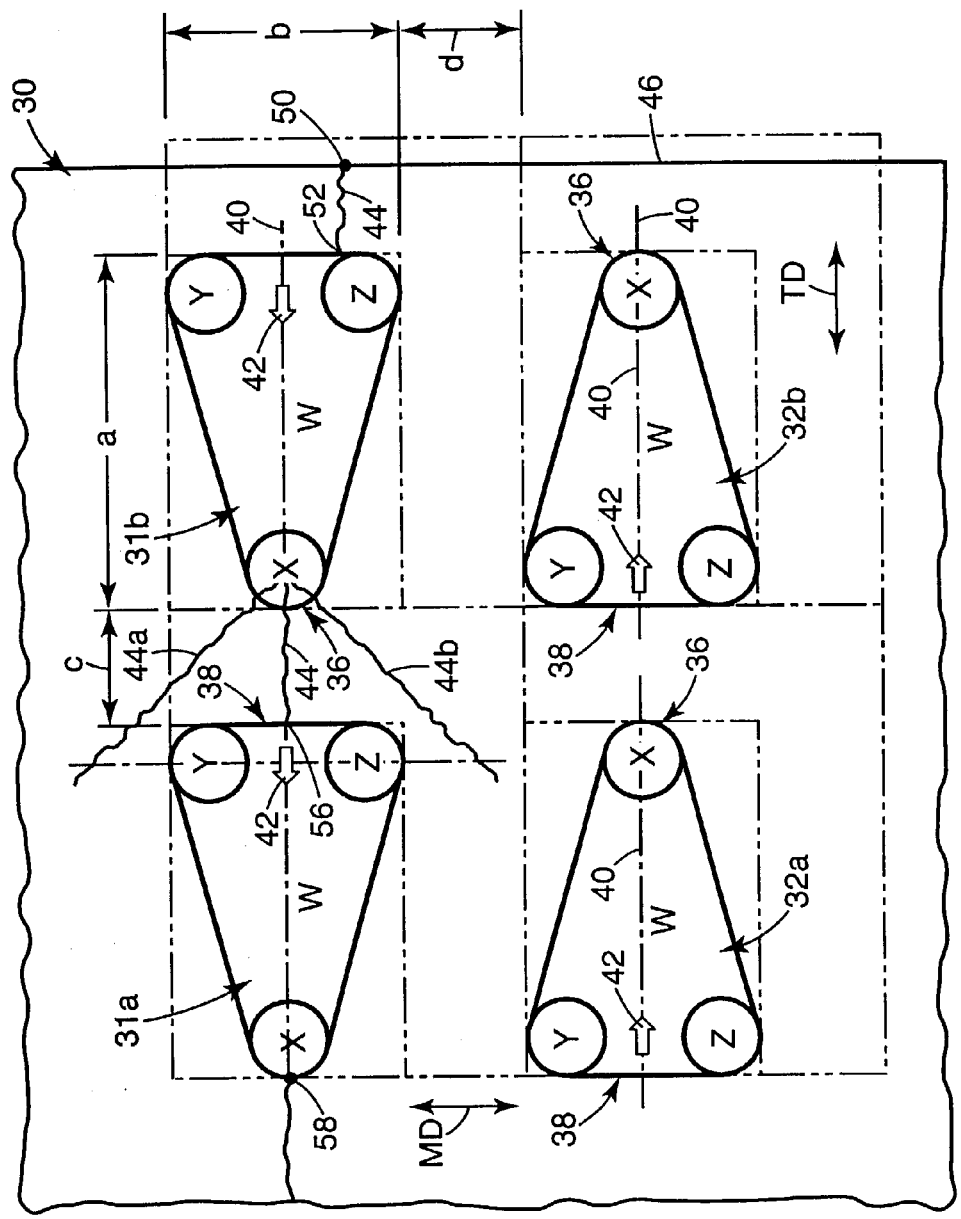
FIG. 3 is an enlarged diagrammatic view of a section of a film with perforations in accordance with an embodiment of the invention.

The perforation pattern formed in polymeric film 14 influencees the tear and tensile properties of the cloth-like films and tape backings of the invention. In FIG. 3, an enlarged layout of a portion of a typical perforated film 30 is shown, with the machine direction oriented top to bottom, and the transverse direction oriented left to right. The perforations may form a pattern over most of the entire surface of a film, and the pattern shown in FIG. 3 is a representative portion of one such pattern. The perforation pattern of film 30 comprises a series of rows of perforations. A first partial row is shown having perforations 31a, and 31b as well as a second partial row having perforations 32a and 32b. While the embodiment shown in FIG. 3 is arranged in rows parallel to the TD and perpendicular to the MD, in other embodiments of the invention the plurality of perforations or pattern may comprise either single or multiple rows of perforations defining a desired tear path. The desired tear path is defined as a line or axis extending through the arranged perforations and may be along any straight or curved line.

The present invention envisions several possible perforation shapes such as the isosceles triangular shape of FIG. 3, or other embodiments as shown in FIGS. 7–17, including "V"-shape, "Y"-shape, "T"-shape and arrow-head shaped perforations. The perforation shapes of the present invention can be described by reference to various key parameters, including the absolute dimensions and orientations of each perforation, plus the placement of the perforations with respect to one another. Key parameters of each perforation include the length "a," width "b," center point "W", major peripheral points "X," "Y" and "Z." Each perforation can be described as having two ends, a narrow end 36 and a wide end 38, wherein point "X" is located at narrow end 36 of each perforation and points "Y" and "Z" are located at wide end 38 and define width "b" of each perforation. The distance "c" represents the distance between perforations within the same row or tear path 40, that is the distance between the narrow end 36 of one perforation and wide end 38 of another, proximal perforation in the same row and along the same desired tear path 40.

Perforations within a desired tear path are aligned such that the narrow end 36 of one perforation is proximal to the wide end 38 of an adjacent perforation and all perforations within a row are substantially aligned along the desired tear path 40. The desired tear path 40 represents a line or axis, which extends through a substantially central portion of both narrow end 36, and wide end 38, approximately equidistance from points "Y" and "Z" of each perforation. Specifically, the perforations within the same desired tear path 40 are generally centered along the same axis and the narrow end of each perforation is on the same side, or the perforations are all "pointing" in the same direction. In some embodiments, the perforation shape is symmetrical, such as in FIGS. 7–15, with the line of symmetry being along the desired tear path 40. However, non-symmetrical shapes such as FIGS. 16 and 17 are also within the scope of the present invention. The alignment of all the perforations within the same tear path 40 provides a preferential tear direction 42, in the same direction that the perforations are pointing. The film 30 or tape comprising a perforation pattern of the present invention will provide a controlled tear propagation line 44 when the force imparted is in the same direction as the preferential tear direction 42.

The distance "d" is defined as the distance between the edge of one perforation at wide end 38 and the edge of a second perforation in an adjacent row, at wide end 38 of the second perforation. Referring to FIG. 3, distance "d" is illustrated as the approximate distance between point "Z" of perforation 31b and point "Y" of perforation 32b. The distance between center point "W" of adjacent perforations in the same row is equal to "c+a." The distance between the center point "W" of adjacent perforations of adjacent rows is equal to "b+d"

Absolute dimensions of the perforations include the following. The length "a" can vary depending upon the intended application and the desired tensile strength. Perforations typically have a length "a" between approximately 0.5 and 5.0 mm (20 to 200 mils), more typically between 0.7 and 3.0 mm (28 to 120 mils) and even more typically between 1.0 and 2.5 mm (40 to 100 mils).

The width "b" of suitable perforations can vary depending upon the intended application, desired tensile strength and a level of acceptable jaggedness to the tear line. Perforations typically have a width "b" between approximately 0.2 and 3.0 mm (8 to 120 mils) and more typically between 0.5 and 2.0 mm (20 to 80 mils).

The distance "c," can also vary depending upon the intended application and desired tensile strength. The distance between perforations in the same row or tear path is typically less than 3 mm (120 mils), more typically less than 2 mm (80 mils) and even more typically less than 1.5 mm (60 mils).

If the perforation pattern comprises an array of rows of perforations, the distance "d" can vary depending upon the intended application, desired tensile strength and a level of acceptable jaggedness to the tear line. The distance "d" between perforations in adjacent rows is typically less than 4 mm (160 mils), more typically less than 3 mm (120 mils), and even more typically less than 2 mm (80 mils).

Figure 3A:
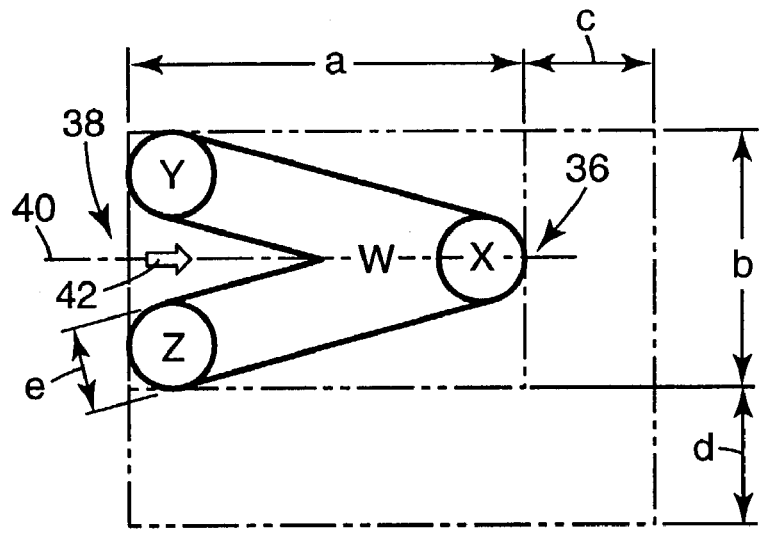
FIG. 3a is an enlarged diagrammatic view of a single perforation in accordance with an embodiment of the invention.
Figure 3B:
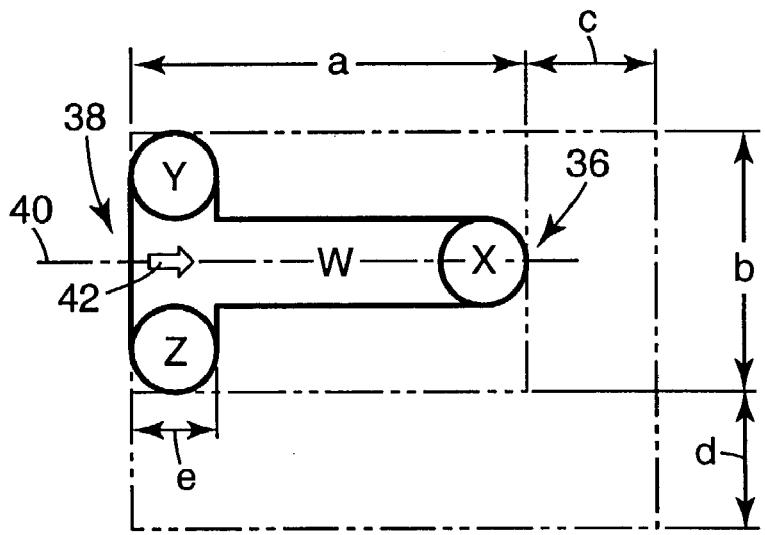
FIG. 3b is an enlarged diagrammatic view of a single perforation in accordance with an embodiment of the invention.

FIGS. 7–9 show "V"-shaped, "Y"-shaped and "T"-shaped perforations as other embodiments of the present invention. FIGS. 3a and 3b also show "V"-shaped and "T"-shaped perforations with additional detail. In the case of perforations in the shape of a letter or character, the distance "e" is defined as the width of the line used to create the character. The distance "e" is typically less than 3 mm (120 mils), more typically less than 2 mm (80 mils), and even more typically less than 1 mm (40 mils).

Figure 4A:
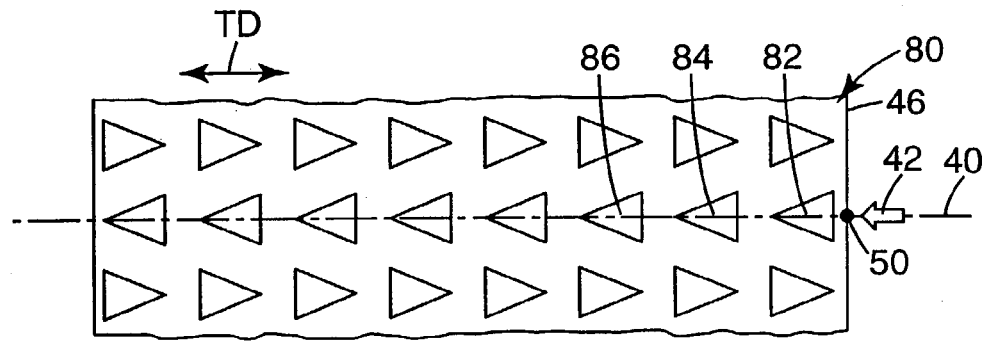
FIG. 4a is an elevated view of a pattern of perforations in accordance with an embodiment of the invention with an anticipated tear path.

When the plurality of perforations in a film comprises a pattern of multiple rows, the rows may "point" in alternating, opposite, directions, such as in FIGS. 3 and 4a. Such embodiments are particularly useful for an adhesive tape construction so that the user can tear by hand the tape construction from either side and still obtain the desired tear propagation in a preferential tear direction from either side edge of the tape. Additionally, in most adhesive tape applications it is important to minimize the distance "d," typically to be less than approximately 4 mm so that the user can choose any point along the side edge of the tape from which to start the tear. In other words, by keeping the distance "d" very small, the film or tape can be torn at virtually any point along the edge.

Figure 4B:
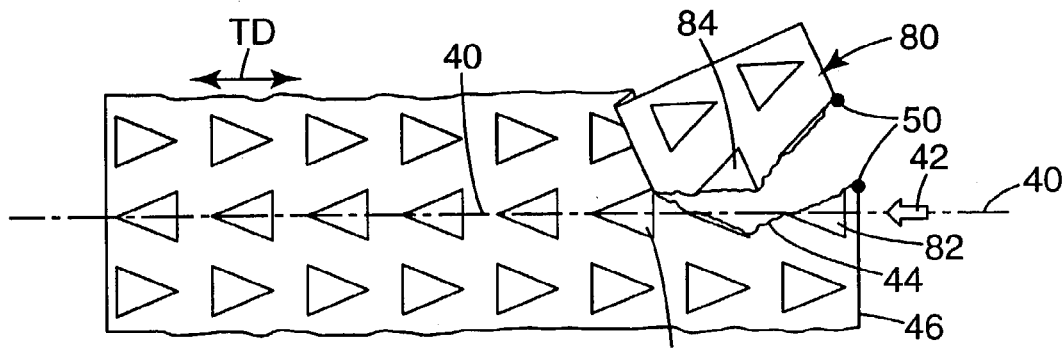
FIG. 4b is an elevated view of the pattern of perforations of FIG. 4a after a tear has been initiated.

One particularly useful embodiment is an adhesive tape comprising a polymeric film comprising a pattern of isosceles triangular perforations arranged in alternating rows pointing in opposite transverse directions, such as the pattern illustrated in FIGS. 3, 4a and 4b.

Referring again to FIG. 3, a tear initiation force is applied at point 50 to an edge 46 of a film 30 initiating a tear propagation line 44 in the preferential tear direction 42. The tear line 44 propagates in the direction of the tear force and is intercepted by the nearest perforation 31b at a point 52 along the width "b" the perforation 31b, between points "Y" and "Z." Once the tear line intercepts the perforation 31b, the open space of the perforation offers no resistance to the tear and thus directs the propagation of the tear towards point "X" of perforation 31b. The raised portion 20 (not shown in FIG. 3) around the perimeter of the perforation inhibits the tear from propagating from some point between "X" and "Y" or between "X" and "Z" of perforation 31b. Thus, the shape and structure of the perforation promote the propagation of the tear line 44 from the narrow end 36 at about point "X."

Due to the direction of the applied tear force and the orientation of the polymer film, typically tear line 44 will propagate at an angle no greater than 45 degrees from the desired tear path 40, such as potential tear propagation lines 44a and 44b, the angle between lines 44a and 44b being approximately no greater than 90 degrees. If the width "b" of perforation 31a is greater than or equal to distance "c," typically tear line will intercept perforation 31a, the next perforation in the desired tear path. If width "b" is greater than two times the distance "c," there is a strong likelihood that the tear propagation line 44 will intersect next perforation 31a in the desired tear path 40.

FIG. 4a shows a film or tape 80 of the present invention with a "2-way" perforation pattern of triangles, having preferential tear direction 42 and desired tear path 40. When a tear force is applied by hand, starting at a tear initiation point 50 on side edge 46, a tear precedes through the row of perforations including, for example, perforations 82, 84 and 86, in that order. FIG. 4b illustrates the tearing of film or tape 80, of FIG. 4a, via tear propagation line 44, along the desired tear path 40 and through perforations 82 and 84, in a manner consistent with the present invention.

In other embodiments it may be desirable to provide a pattern of perforations comprising rows that all point in the same direction, such that preferential tear direction 42 is uni-directional for the entire film or tape. In still other embodiments it may be preferred to have some designed combination of adjacent rows of perforations pointing in one direction and some other combination of other adjacent rows pointing in another direction, providing different preferential tear directions.

Figure 5:
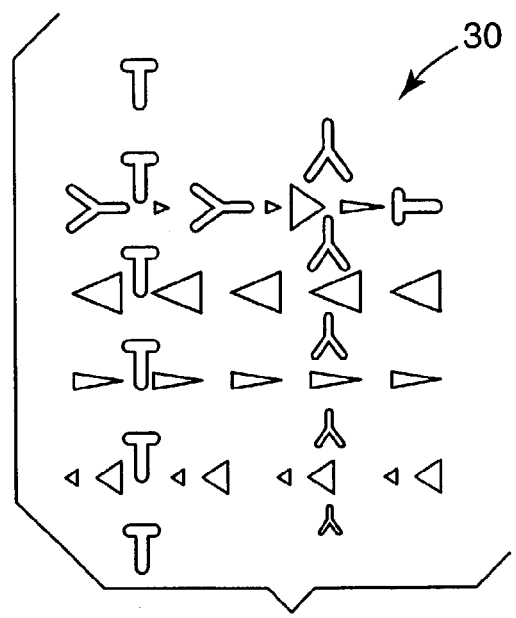
FIG. 5 is an elevated view of a pattern of perforations in accordance with an embodiment of the invention.

Any number of possible perforation patterns could be designed for specific applications employing various combinations of single or multiple perforation rows; varying distances between rows; variations in perforation shape and/or size; variations within a row or across different rows of perforations; variations in preferential tear direction, straight or curved tear perforation paths and combinations of various directions or angles of tear propagation paths relative each other and relative to MD and TD. FIG. 5 shows a perforation pattern with a various combinations of perforation shapes, sizes, rows and desired tear paths all of which are still within the key parameters of the present invention.

When such a film or tape is torn by hand, in the preferential tear direction, the tear tends to propagate from perforation to perforation along the series of perforations in the specific tear propagation path 40 or row of perforations, with little tendency to "jump" from the row upon which the tear was initiated to an adjacent path or row. Further, hand-tear at any angle or direction that is not in line with a tear propagation path 40 or in the preferential tear direction 42 is more difficult and will most likely result in a tear, which is jagged, and/or in an undesirable direction.

Thus, the films and tapes of the invention advantageously tear in a controlled direction. As used herein, straight line tearing refers to the property of propagating a tear along a piece of film in a substantially straight manner, along the desired tear path, such as is normally observed with cloth-backed tapes, including duct tape. Such tears are not usually perfectly linear, but have a substantially straight direction. In addition, a torn film produced in accordance with the invention can still exhibit occasional deviations from a straight line, and does not necessarily provide a smooth edge. Films produced in accordance with the invention typically exhibit improved straight-line tearing relative to non-perforated film. In addition, the films of the invention typically exhibit improved tear control compared to other perforated films.

Specifically, patterns closely resembling that shown in FIG. 4a provide a unique combination of high tensile strength, low elongation to break, easy initiation of tear in the preferential tear direction along the tear propagation path of the film or tape, and macroscopically straight-line tearability. Tear propagation forces for tapes made with the current invention are also in the same range as those for woven cloths typically used as adhesive tape backings.

The tear and tensile properties of the films and tapes of this invention will be affected both by the properties of the film, which is perforated, and the pattern of the perforations. In the case where the film before perforation is a biaxially oriented film having very nearly balanced tear and tensile properties in the MD and TD, the perforation pattern will determine the balance between MD and TD properties in the perforated film.

The raised portion, ridge or rim, around each perforation, controls propagation of the tear, (relative to that of unperforated film) to a level more appropriate to a woven cloth, and the provision of a cloth-ripping sound as the tear passes through the ridge around each perforations one by one. The tear initiation force, however, is reduced, relative to that of unperforated film.

Figure 6A:
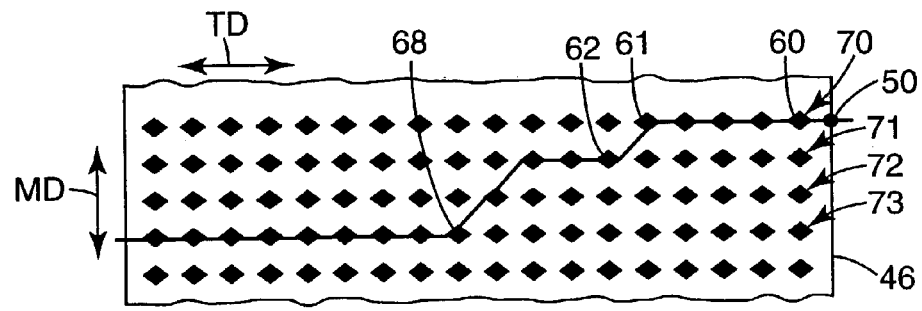
FIGS. 6a–6d are elevated views of a tear propagation line through a pattern of perforations.
Figure 6B:
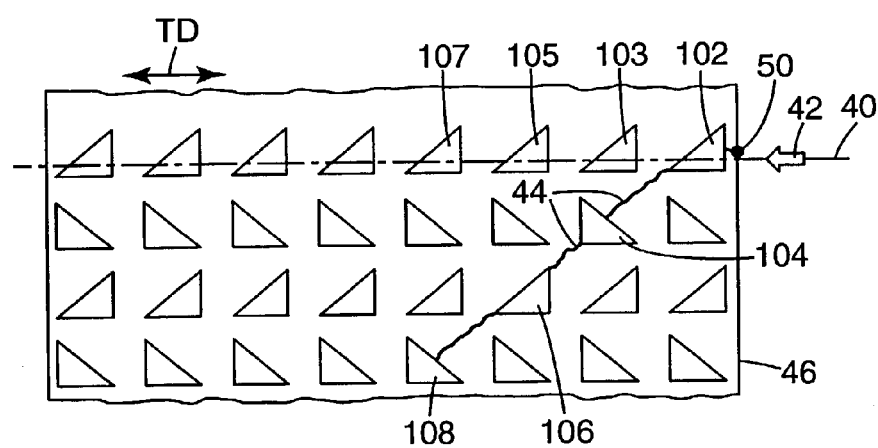
Figure 6C:
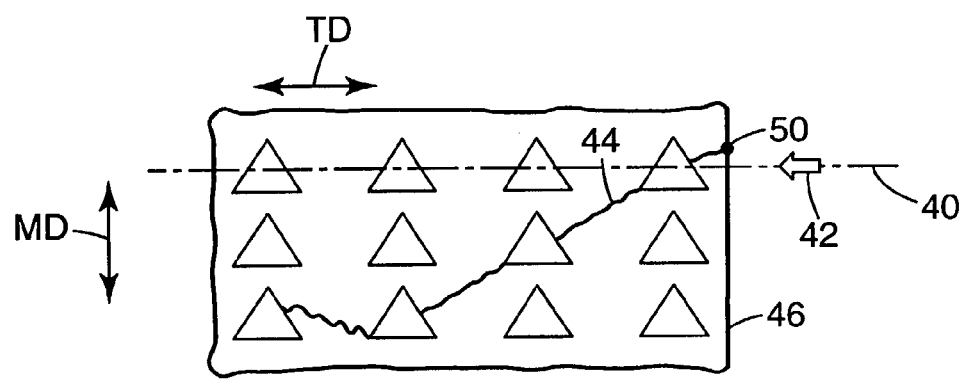
Figure 6D:
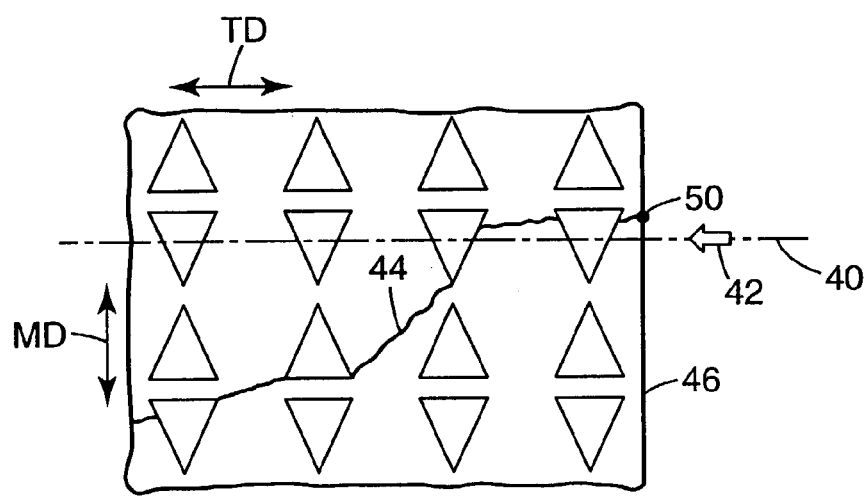

FIG. 6a shows a film with a pattern of diamond-shaped perforations. FIG. 6a also illustrates a tear line initiated at a point 50 along side edge 46. The tear propagation line intercepts the first perforation 60 of the row 70 and continues along row 70 to perforation 61, skipping from perforation 61 of row 70 to perforation 62 of row 71 and eventually to perforation 68 of row 73. Such a tear line can be measured quantitatively by either counting the number of rows across which the tear line propagates, which in this case would be three, or by measuring the perpendicular distance across those rows, in the MD. FIG. 6b shows a film with a perforation pattern comprising right triangles and illustrates a tear line initiated in preferential tear direction 42, the TD direction, at a point 50 along side edge 46. However, it can be seen that for this particular arrangement of right triangles the tear propagation line 44 does not follow the desired tear path 40 through perforations 102, 103, 105 and 107 but instead propagates through perforations 104, 106 and 108. FIGS. 6c and 6d also illustrate perforation patterns comprising triangles, which due to arrangement of the triangular perforations may represent non-preferred embodiments of the present invention.

B. Materials

Films made in accordance with the invention are partially or completely formed of polymeric materials, including thermoplastic compositions. The perforated film is typically a thermoplastic, especially a polyolefin, including polypropylene in specific embodiments. Other polymers may be advantageously employed, especially those polymers which are commonly used for making biaxially oriented films, such as polyethylene terephthalate and other polyesters. For the purposes of the present invention, the term "polypropylene" is meant to include copolymers comprising at least about 90% propylene monomer units by weight. "Polypropylene" is also meant to include polymer mixtures comprising at least about 75% polypropylene, by weight.

The polypropylene is preferably predominantly isotactic, and thus has a chain isotacticity index of at least about 80%, an n-heptane soluble content of less than about 15% by weight, and a density between about 0.86 and 0.92 grams/$cm^3$ measured according to ASTM D1505-96 ("Density of Plastics by the Density-Gradient Technique"). Suitable additional polymers in such mixtures include, but are not limited to, propylene copolymers, polyethylenes, polyolefins comprising monomers having from four to eight carbon atoms, and other polypropylene resins.

Typical polypropylenes for use in the present invention have a melt flow index between about 0.1 and 15 grams/ten minutes according to ASTM D1238-95 ("Flow Rates of Thermoplastics by Extrusion Plastometer") at a temperature of 230° C. and force of 21.6 N, a weight-average molecular weight between about 100,000 and 400,000, and a polydispersity index between about 2 and 15. Typical polypropylenes for use in the present invention have a melting point of greater than about 130° C., preferably greater than about 140° C., and most preferably greater than about 150° C., as determined using differential scanning calorimetry.

Further, the polypropylenes useful in this invention may be copolymers, terpolymers, quaterpolymers, etc., having ethylene monomer units and/or alpha-olefin monomer units with 4–8 carbon atoms. Other suitable co-monomers include, but are not limited to, 1-decene, 1-dodecene, vinylcyclohexene, styrene, allylbenzene, cyclopentene, norbornene, and 5-methylnorbornene. Said co-monomer(s) may be present in an amount so as not to adversely affect the desired properties and characteristics of the films, and tapes described herein, typically their content being less than 10 percent by weight. One suitable polypropylene resin is an isotactic polypropylene homopolymer resin having a melt flow index of 2.5 g/10 minutes, commercially available under the product designation 3374 from FINA Oil and Chemical Co., Dallas, Tex.

The polypropylene may be intentionally partially degraded during processing by addition of organic peroxides such as dialkyl peroxides having alkyl groups with up to six carbon atoms, 2,5-dimethyl-2,5-di(tert-butylperoxy)hexane, and di-tert-butyl peroxide. A degradation factor between about 2 and 15 is suitable. Recycled or reprocessed polypropylene in the form of scrap film or edge trimmings, for example, may also be incorporated into the polypropylene in amounts less than about 60% by weight.

Polypropylene for use in the present invention may optionally include, in an amount so as not to adversely affect the desired characteristics and properties described herein, typically between 1 and 40% by weight of a resin, of synthetic or natural origin, having a molecular weight between about 300 and 8000, and having a softening point between about 60° C. and 180° C. Such resin can be chosen from petroleum resins, styrene resins, cyclopentadiene resins, and terpene resins. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constituents, pinene, alpha-pinene, dipentene, limonene, myrcene, and camphene. These resins may be partially or fully hydrogenated.

In embodiments such as those shown in FIG. 2, top film 22 comprises a thermoplastic, and can be chosen in view of particular adhesive tape applications. In one embodiment, the polymeric tape will be a duct tape, and the top film 22 will be a polyolefin, preferably a polyethylene, more preferably a low density polyethylene. In another embodiment, the polymeric tape will be a breathable tape, such as a medical tape, and the top film 22 will be a permeable polymer such as a polyurethane. In yet another embodiment, the polymeric tape will be a non-curling, dimensionally stable tape, and the top film 22 will be a polypropylene film with coefficients of thermal expansion in each of the principal in-plane directions substantially identical to those of the perforated film 14.

The adhesive coated as bottom film 24 onto the second major surface 18 of perforated film layer 14 may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive may be applied by solution, water-based or hot-melt coating methods. The adhesive can include hot melt-coated formulations, transfer-coated formulations, solvent-coated formulations, and latex formulations, as well as laminating, thermally activated, and water-activated adhesives. Useful adhesives according to the present invention include pressure sensitive adhesives. Pressure sensitive adhesives are well known to possess aggressive and permanent tack, adherence with no more than finger pressure, and sufficient ability to hold onto an adherend.

Various adhesives can be used to form bottom film 24, and include those based on general compositions of polyacrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above.

Additionally, the adhesives can contain additives such as tackifiers, plasticizers, fillers, antioxidants, stabilizers, pigments, diffusing materials, curatives, fibers, filaments, and solvents. Also, the adhesive optionally can be cured by any known method. The adhesive may be applied in any desired amount, and typically is applied to provide a conventional dry coating weight between about 0.001 to 0.01 grams/cm$^2$.

A general description of useful pressure sensitive adhesives may be found in the Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

Films of the present invention may optionally include, in either the perforated film layer 14, the top film 22 or any intervening layer, additives and other components as is known in the art. For example, the films and tapes of the present invention may contain fillers, pigments and other colorants, antiblocking agents, lubricants, plasticizers, processing aids, antistatic agents, nucleating agents, antioxidants and heat stabilizing agents, ultraviolet-light stabilizing agents, and other property modifiers. Fillers and other additives are preferably added in an amount selected so as not to adversely affect the properties attained by the preferred embodiments described herein.

Organic fillers may include organic dyes and resins, as well as organic fibers such as nylon and polyimide fibers, and inclusions of other, optionally crosslinked, polymers such as polyethylene, polyesters, polycarbonates, polystyrenes, polyamides, halogenated polymers, polymethyl methacrylate, cyclo-olefin polymers, and the like.

Inorganic fillers may include pigments, fumed silica and other forms of silicon dioxide, silicates such as aluminum silicate or magnesium silicate, kaolin, talc, sodium aluminum silicate, potassium aluminum silicate, calcium carbonate, magnesium carbonate, diatomaceous earth, gypsum, aluminum sulfate, barium sulfate, calcium phosphate, aluminum oxide, titanium dioxide, magnesium oxide, iron oxides, carbon fibers, carbon black, graphite, glass beads, glass bubbles, mineral fibers, clay particles, metal particles, and the like.

In some applications it may be advantageous for voids to form around the filler particles during an orientation process. Organic and inorganic fillers may also be used effectively as antiblocking agents. Alternatively, or in addition, lubricants such as polydimethyl siloxane oils, metal soaps, waxes, higher aliphatic esters, and higher aliphatic acid amides (such as erucamide, oleamide, stearamide, and behenamide) may be employed.

The film may contain antistatic agents, including aliphatic tertiary amines, glycerol monostearates, alkali metal alkanesulfonates, ethoxylated or propoxylated polydiorganosiloxanes, polyethylene glycol esters, polyethylene glycol ethers, fatty acid esters, ethanol amides, mono- and diglycerides, and ethoxylated fatty amines. Organic or inorganic nucleating agents may also be incorporated, such as dibenzylsorbitol or its derivatives, quinacridone and its derivatives, metal salts of benzoic acid such as sodium benzoate, sodium bis(4-tert-butyl-phenyl)phosphate, silica, talc, and bentonite.

Antioxidants and heat stabilizers can further be incorporated, including phenolic types (such as pentaerythrityl tetrakis [3-(3,5-di-tert-butyl-4-hydroxyphenyl)propionate] and 1,3,5-trimethyl-2,4,6-tris(3,5-di-tert-butyl-4-hydroxybenzyl)benzene), and alkali and alkaline earth metal stearates and carbonates. Other additives such as flame retardants, ultraviolet-light stabilizers, compatibilizers, antimicrobial agents (e.g., zinc oxide), electrical conductors, and thermal conductors (e.g., aluminum oxide, boron nitride, aluminum nitride, and nickel particles) may also be blended into the polymers used to form the film or tape backing.

The perforated film layer 14 of tape 12 may be optionally treated on either or both major surfaces 16 and 18 by exposure to flame or corona discharge or other surface treatments, including chemical priming, to improve adhesion of subsequent coating layers. In addition, the exposed surface of top film 22 may be coated with optional low adhesion backsize materials to restrict adhesion between the opposite surface adhesive layer and the top film 22, thereby allowing for production of adhesive tape rolls capable of easy unwinding, as is well known in the adhesive coated tape-making art.

The films of this invention, when used as a backing for a tape, preferably have a final thickness between about 0.5 mils to 6 mils (0.013 mm to 0.152 mm). Thicker and thinner films may be used, with the understanding that the film should be thick enough to avoid excessive flimsiness and difficulty in handling, while not being so thick so as to be undesirably rigid or stiff and difficult to handle or use. Variability in film thickness, as measured by the standard deviation relative to the average, is preferably less than 10% down the web and across the interior width of the film excluding its edge areas.

The details of converting film backings into tapes are known. See, for example, U.S. Pat. No. 4,451,533, "Dispensable Polypropylene Adhesive-Coated Tape," (Wong et al), the entire disclosure of which is incorporated herein by reference.

The films described herein are suited for many adhesive tape backing applications. The presence of the top film 22 over the perforation pattern can provide an appearance similar to a poly-coated cloth-based tape backing in certain implementations. This appearance, combined with the tensile and tear properties, makes the film useful as a backing for duct tape, gaffer's tape, or the like. Because the backing is conformable, it is also useful as a masking tape backing.

C. Perforated Film Production Methods

In some embodiments, the film is made of oriented polymers, for example, the film may be made of biaxially oriented polymers. Biaxially oriented polypropylene (BOPP) is commercially available from several suppliers including: ExxonMobil Chemical Company of Houston, Tex.; Continental Polymers of Swindon, UK; Kaisers International Corporation of Taipei City, Taiwan and PT Indopoly Swakarsa Industry (ISI) of Jakarta, Indonesia. Also, the perforated film of the present invention can be manufactured using various film forming, orientation, and perforation techniques.

In one implementation, the film is initially cast into sheet form to prepare a sheet suitable for stretching to make an oriented film. When making polypropylene films, one suitable method for casting a sheet is to feed the resin into a feed hopper of a single screw, twin screw, cascade, or other extruder system having an extruder barrel temperature adjusted to produce a stable homogeneous melt. The polypropylene melt can be extruded through a sheet die onto a rotating cooled metal casting wheel. Optionally, the casting wheel can be partially immersed in a fluid-filled cooling bath, or, also optionally, the cast sheet can be passed through a fluid-filled cooling bath after removal from the casting wheel.

After formation, the sheet is stretched to provide an oriented film. Various methods or apparatuses for stretching the film can be used. A first method includes use of a sequential biaxial stretching apparatus that typically first stretches in the machine direction by passing the film over a sequence of rotating rollers whose speed provides a higher output film line speed than input speed, followed by transverse direction stretching in a tenter on diverging rails. Alternative methods include use of simultaneous biaxial stretching by a mechanical tenter such as the apparatus disclosed in U.S. Pat. Nos. 4,330,499 and 4,595,738; and use of the tenter apparatus for simultaneous biaxial stretch disclosed in U.S. Pat. Nos. 4,675,582; 4,825,111; 4,853,602; 5,036,262; 5,051,225; and 5,072,493 (all incorporated by reference). Biaxially stretched films can also be made by blown film, double-bubble, and tubular film techniques.

For polypropylene films, typically the stretch ratio for both the machine direction (MD) and the transverse direction (TD) is from about 4:1 to 12:1, although any combination of stretch ratios for the MD and TD within this range may also be used. In certain embodiments, the MD and TD stretch ratios are about 6:1 to about 10:1. In specific embodiments, the machine direction stretch ratio is from about 8:1 and the transverse direction stretch ratio is also about 8:1.

The temperatures of the stretching operation can be chosen to provide a film having the desired characteristics and properties. These temperatures will vary with the material used, and with the heat transfer characteristics of the particular apparatus used. For one implementation utilizing polypropylene, the preheat roll and the stretch roll for the machine direction stretch are maintained at about 120–135° C. For the transverse direction stretch in the tenter, the preheat zone is typically maintained at about 180–190° C., and the stretch zone is maintained at about 160–180° C. For simultaneously stretched backings, the preheat temperature and stretch temperatures are usually from approximately 160° C. to 215° C.

Perforation of the film used to prepare perforated film layer 14 may be done by a variety of techniques. It is preferred that the perforation technique used result in perforations that lack sharp edges. In some embodiments, the perforation technique used may result in the formation of substantially uniform raised portion 20 at the edges of the perforations, and that said raised portions 20 form as a result of highly localized melting of the film being perforated in isolated spots.

It is not necessary for each of the perforations to be wholly identical to the others or absolutely precise in shape, size, or openness. Many perforation techniques known in the art, including most thermal techniques, create perforations that vary somewhat in size and perfection of shape, and this does not have a significant deleterious effect on the current invention. Similarly, perforations can be less than entirely open without deleterious effect. Thus, perforations can have "streamers" of the polymeric material spanning the perforation, in effect turning what was intended to be one open-area perforation into two or more closely grouped irregularly shaped and sized perforations having, collectively, a designed outer boundary shape with single border. Likewise, a perforation shape of the present invention can be intentionally simulated by a series of closely grouped smaller perforations of circular or other shape. Such variations have minimal or no deleterious effect on the advantageous properties of the present invention and are anticipated by it.

Similarly, not all perforations in film 14 need to completely penetrate through both film surfaces 16 and 18, provided that a significant portion of the perforations do. Thus, some locations in the perforation pattern may instead be the sites of depressions or pits which do not fully penetrate both film surfaces, without deleterious effect on the desired tear and tensile properties of the film.

Perforation techniques usable in making the perforated film 14 in the present invention include perforation by impingement of a hot fluid, especially a hot gas, as disclosed in U.S. Pat. No. 3,038,198 and United Kingdom Patents Nos. 851,053, 851,473, 1,073,605, and 2,313,338; perforation by impingement of a flame, as disclosed in U.S. Pat. No. 3,394,211 and U. K. Patents Nos. 1,012,963; 1,073,605, and 2,313,338; perforation by fusion-slitting with heated blades, as disclosed in U.S. Pat. No. 3,985,600; perforation by embossing followed by opening of the ends of the protrusions by heating, as disclosed in U.S. Pat. No. 4,248,822; perforation by thermally embossing with an embossing roll having protruding knobs while simultaneously taking up the film at a rate not less than the speed of the embossing roll, as disclosed in U.S. Pat. No. 4,978,486; perforation by puncture with hot needles; perforation using ultrasonic waves; perforation using infrared energy in place of heated gas or flame; and perforation by energy impingement, such as by laser, electron beam, or corona discharge.

A specific method and apparatus for perforating the film layer 14 is described in U.S. patent application Ser. No. 10/267,538, filed Oct. 9, 2002, and entitled "An Apparatus for Flame-Perforating Films and Methods of Flame-Perforating Films," assigned to the same assignee and the teachings of which are incorporated herein by reference.

The top film 22 may be affixed to the perforated film 14 by a variety of techniques, including affixing a pre-formed top film 22 to the perforated film 14 by lamination. Adhesive, thermal, or other lamination methods known in the art may be used. Alternatively, the top film 22 may be coated upon the perforated film 14. Various coating methods known in the art may be used, including solvent-based coating methods and extrusion coating. In addition, top film 22 may be affixed to perforated film 14 by coextrusion of the two layers prior to the perforation step in the process, provided said perforation step is performed in such a way as to substantially perforate layer 14 while leaving top film 22 substantially unpenetrated.

In a first implementation, top film 22 is affixed to the perforated film 14 by thermal lamination to a pre-primed perforated film 14. Perforated film 14 may be pre-primed by any technique known in the art, including but not limited to flame treatment, corona treatment, plasma treatment, electron beam, ultraviolet, and chemical treatments.

Alternatively, the perforated film 14 may be prepared as a dual-layer film, with the second layer being a priming polymer layer. When top film 22 comprises LDPE, and perforated film 14 comprises biaxially oriented polypropylene, a preferred method is to prepare perforated film 14 as a dual-layer film, the second layer comprising a polyethylene, preferably low density polyethylene or linear low density polyethylene. The polyethylene layer comprises preferably 1–10% of the total thickness of the perforated film 14, more preferably 2–5% of the total thickness. This polyethylene layer serves as a priming polymer layer for thermal lamination to the top film 22. When this method is used, a particularly preferred top film 22 is a low density polyethylene blown film.

The top film 22 may also comprise a multilayer film. In one particular embodiment, top film 22 comprises a polyethylene three-layer film wherein the central layer includes a blocker or absorber for ultraviolet (UV) light. Use of such a top film 22 provides extended life to the cloth-like film or adhesive tape when exposed to UV radiation, as in an outdoor application. The performance over time of the adhesive in an adhesive tape may be particularly enhanced in this embodiment, as many adhesives are particularly subject to UV degradation.

The surface of perforated film 14 that bears the raised portions 20 is not limited. Thus, in the dual-layer perforated film exemplified above, raised portions 20 may be on the biaxially oriented polypropylene surface or on the polyethylene surface. Raised portions 20 are preferably on the biaxially oriented polypropylene surface. Likewise, the orientation of the surface having the raised portions in the completed adhesive tape or cloth-like film construction is not limited. Top film 22 may be affixed to either the raised surface of perforated film 14 or to the non-raised surface.

In another alternative processing method, the top film 22 may be affixed to the layer that will become perforated film 14 prior to the perforation step. Perforation may then be performed by techniques mentioned above in such a way that the perforations extend through the perforated film 14, and, optionally, into but not completely through top film 22.

Subsequent to formation of the tape by the methods disclosed herein, an additional optional processing step comprising a small amount of additional stretching, either uniaxial or biaxial, results in increased "bulk" or "loft", further reduces elongation to break, and provides an even more marked cloth-like appearance or "look" than that possessed by the film or tape backing of the invention lacking said additional optional processing. For optimal loft, uniaxial orientation is preferred.

D. EXAMPLES

Test Methods

ASTM D-3759 Tensile Strength and % Elongation at Break

Tensile strength in the machine direction (MD), transverse direction (TD) and the percent elongation at break in the MD of the samples was determined as generally described in ASTM D-3759 in a controlled environment of 23+/−2 deg C. and 50+/−5% RH. Tensile strength results are recorded in lbs/in and converted to Newtons/cm. MD tensile strength values referred to herein were effectively determined in triplicate using a Universal Testing Instrument, Model 1122, available from Instron Co., of Canton, Mass. using a cross-head speed of 5 inches/minute (12.7 cm per minute). The gauge length (jaw gap) was set at 5 inches (12.7 cm), and the test sample was 10 inches (25.4 cm) long and 1 inch (2.54 cm) wide. The average of 3 samples tensile strength and percent elongation at break results are shown in Table 1.

Snap Tear

The Snap Tear Method was performed as follows. The method can be performed in either a left-to-right direction or a right-to-left direction, depending on the analyst's preference. The following describes the method as performed in a left-to-right direction. A test strip of perforated polymer film measuring approximately 2 inches in the TD×9 inches in the MD (5×23 cm) was laid down on a secure flat substrate (table-top), in a horizontal or left-to-right orientation, relative to the analyst. The analyst firmly placed a finger or more typically the thumb of the left hand at a point along the top edge of the test strip and approximately ¾ to 1½ inch (2 to 4 cm) in from the left end of the test strip. This hold-point defined the initiation point of the tear, which was to be propagated downward from the top of the test strip completely through the width of the test strip. While firmly holding down the test strip at the point described above, the remaining portion of the test strip was gripped with the right hand, primarily between the thumb and the index finger. A section of approximately 2 to 4 inches (5 to 10 cm) of test strip was allowed between the hold-down point and the right hand. Prior to the tear movement, the test strip was held in a straight horizontal orientation, the section between the hold-down point and the right hand was held taut and the right hand was positioned about 2 inches (5 cm) above the substrate. Finally, the snap tear was made by moving the right hand in one quick motion in a direction that was upwards and over the hold-down point, while simultaneously pulling on the test strip and turning the right hand partially over and towards the analyst's chest, so as to direct the tear propagation of the film downwards, from top (hold-down point) to bottom, across the width of the test strip. This Snap-Tear Method quickly tore completely through the width of the test strip in a fraction of a second. This test procedure was repeated on the same test strip three times by selecting a new hold-down point relative to the new, freshly torn, left end of the test strip.

Pinch Tear

The Pinch Tear Method was performed as follows. A test strip of perforated polymer film measuring approximately 2 inches in the TD×9 inches in the MD (5×23 cm) was horizontally held firmly between the thumb and index finger of both the left hand and the right hand at a point along the top edge of the test strip and approximately ¾ to 1½ inch (2 to 4 cm) in from the left end of the test strip. The test strip was pinched so that the thumbs and index fingers of both hands touched, defining a tear initiation point on the top edge of the test strip between the pinch points of each hand. The test strip was held at approximately chest height and about 8 to 12 inches away from the analyst's body. Finally, the pinch tear was made in one quick motion by moving the right hand towards the analyst's chest, while simultaneously moving the left hand directly opposite and away from the right hand. Note: if the analyst prefers, the direction of hands may be reversed.

The Snap Tear and the Pinch Tear test methods are intended to simulate real-world techniques of tearing a film or tape by hand. Hand tearing is often employed because it is quick and convenient and does not require scissors or other cutting tools. One particular advantageous characteristic of the present invention is to provide a film or tape that can be hand-torn to provide a less jagged controlled tear than other films or tapes. After employing either the Snap Tear or a Pinch Tear techniques the tear control feature can be quantitatively measured by either counting the number of adjacent rows across which the tear propagates or by measuring the total lateral distance from the starting row from which a tear line deviates. For example a sample as illustrated in FIG. 6a would have a Snap Tear or Pinch Tear, depending on which tear technique was employed, result of "3 rows" because the tear line propagated across three rows of perforations or in terms of absolute distance, the distance from row 70 to row 73.

Film/Tape Tear Energy Test

The following procedure was used to determine the MD and TD tear properties related to initiation and propagation of tear of the film and tape specimens. A 5 cm wide (in the direction in which it was to be torn) by about 9 cm long specimen was cut from the film or tape. The ends of the specimen were folded over in the direction of greater size (the width), leaving slightly less than 0.64 cm of single-ply film or tape in the center. In the case of adhesive coated tape, the ends were folded over adhesive-to-adhesive. Thus, stubs of approximately 2 cm width, with the adhesive trapped inside, were created at each end of the single-ply center area. This prevented adhesion of the sample to the jaws of the testing apparatus, and promoted tearing in the desired central location. A standard tensile tester was used and the specimen was mounted in such a way that the length dimension was horizontal. The specimen was clamped in such a way that only 0.32 cm of each of the stub areas was contacted by the jaws; with the remainder of the sample protruding out to the side and the remainder of the jaw clamping area being empty. The initial separation of the jaws was 0.64 cm. The jaws were separated at a rate of 127 cm/min. Tear initiated in the central single-ply zone at the end near the clamps, and propagated along the 5 cm length of the single-ply zone.

A typical force vs. displacement trace for this test showed a rise in force as the specimen resists tearing. The tear initiation energy or maximum load is the peak force immediately followed by a sudden drop in force upon initiation of the tear. The displacement at this point, divided by the gauge length, is the elongation-to-tear initiation. The area below the curve up to this point is the tear initiation energy. For the cloth-based or cloth-like film-based specimens, the force trace upon initiation of tear did not drop to zero but, rather, after some initial large fluctuation(s), arrived at a steady level. This level is the tear propagation force. There was usually a small amount of "sawtooth"-like fluctuation at the level of the tear propagation force, due to the perforated nature of the films and tapes of this invention. At the conclusion of the 5 cm long tear, the force dropped to zero. The area under the entire test trace is the total tear energy. The tear propagation energy is the difference between the total tear energy and the tear initiation energy. The total energy absorption (TEA) is the area under the entire test trace divided by the area of the specimen.

The operation of the present invention will be further described with regard to the following detailed examples. These examples are offered to further illustrate the various specific and preferred embodiments and techniques. It should be understood, however, that many variations and modifications may be made while remaining within the scope of the present invention.

Comparative Example 1

A simultaneously biaxially oriented polypropylene (SBOPP) film, made as described above, was obtained. The nominal stretch ratios for the film were about 8:1 in both the MD and TD. The thickness of the film was 0.030 mm (1.2 mil) and the dimensions of the sample pattern were about 5×30 cm (2×12 inches). This film was perforated by feeding the film and a photocopy of a sheet of paper printed with the desired perforation pattern into a 3M (St. Paul, Minn.) infrared Transparency Maker. The infrared radiation was absorbed by the black markings on the sheet of paper, which locally heated the SBOPP, causing melting and retraction of the oriented polymer at those spots, resulting in perforations with substantially uniform raised portions, or rims at their boundaries. The perforation pattern was that of the ovals of FIG. 1, with both row-to-row distance and column-tocolumn distance being 3.2 mm. The perforation length was 1.52 mm and the perforation width was 0.51 mm. The perforations were oriented at 45 degrees to the MD and TD as shown in FIG. 1. The film was hand-tearable along relatively straight lines in both the MD and TD.

Comparative Example C2

Comparative Example 2 was a film prepared in the same manner as Comparative Example C1 with the ovals having the same length and width dimensions however the oval perforations were arranged in rows and columns, the rows aligned in the transverse direction and columns being aligned in the machine direction. The distance between columns or perforations in the same row being approximately 0.86 mm and the distance between rows being 3.09 mm.

Comparative Examples C3

Comparative Example C3 was a film prepared in the same manner as Comparative Example C1 with a perforation pattern comprising right triangles with the general pattern that is shown in FIG. 6b and specific dimensions shown in Table 1.

Comparative Examples C4 and C5

Comparative Examples 4 and 5 were films prepared in the same manner as Comparative Example C1 with perforation patterns comprising isosceles triangular shapes with general patterns shown in FIGS. 6c and 6d, respectively and specific dimensions shown in Table 1.

Comparative Examples C6 and C7

Comparative Examples C6 and C7 were films prepared in the same manner as Comparative Example C1 with a perforation pattern comprising diamond shapes with the general pattern shown in FIG. 6a and specific dimensions shown in Table 1.

Examples E1 and E2

Examples E1 was a film prepared in the same manner as Comparative Example C1 with perforation patterns comprising isosceles triangular shapes and specific dimensions shown in Table 1. Example E1 was essentially the same pattern as E2 except that all the rows of perforations were aligned in the same preferential tear direction. In other words, all the isosceles triangles were pointing in the same direction. This type of pattern for Example E1 is referred to as "one-way." The pattern represented by Example E2, shown in FIG. 4a, is referred to as "two-way" because there are basically two preferential tear directions.

Examples E3

Examples E3 was a film prepared in the same manner as Comparative Example C1 with a perforation patterns comprising block arrow shapes, as shown in FIG. 13, with a two-way pattern and specific dimensions shown in Table 1.

Examples E4 and E5

Examples E4 and E5 were films prepared in the same manner as Comparative Example C1 with perforation patterns comprising "T"-shapes with the general shape shown in FIG. 3b and FIG. 9, with specific dimensions shown in Table 1. Example E4 was a "one-way" pattern and Example E5 was a "two-way" pattern. The "T"-shaped perforations were arranged in a pattern of rows and columns, the spacing of which is shown in Table 1. Example E5 was analogous to the pattern shown in FIG. 4a, with the exception that "T"-shaped perforations were used instead of triangular shaped perforations.

Examples E6–E19

Examples E6 through E19 were films prepared in the same manner as Comparative Example C1 with perforation patterns comprising "V"-shapes with the general shape shown in FIG. 3a and FIG. 7, with specific dimensions shown in Table 1. Examples E6–E11, E13, E15, E17 and E22 were all "two-way" patterns and Examples E12, E14, E16 and E23 were all "one-way" patterns. Examples E6–E11, E13, E15 and E17 were analogous to the pattern shown in FIG. 4a, with the exception that "V"-shaped perforations were used instead of triangular shaped perforations.

Examples E20–E23

Examples E20 through E23 were films prepared in the same manner as Comparative Example C1 with perforation patterns comprising "Y"-shapes with the general shape shown in FIG. 8 and specific dimensions shown in Table 1. Examples E20–E22 were all "two-way" patterns and Examples E23 was a "one-way" pattern. Examples E20–E22 were analogous to the pattern shown in FIG. 4a, with the exception that "Y"-shaped perforations were used instead of triangular shaped perforations.

TABLE 1

Perforation Shapes, Patterns and Dimensions - Average Test Results

| Sample | Direction & Perforation type | a | b | c | d | e | MD Tensile lbs/in | MD Tensile N/cm | % Elong. | Snap Tear rows | Pinch Tear rows |
|---|---|---|---|---|---|---|---|---|---|---|---|
| C1 | Ovals at 45° | 1.52 | 0.51 | — | — | — | 7.36 | 12.88 | 18.9 | 10.0 | 0.7 |
| C2 | horizontal ovals | 1.52 | 0.51 | 0.86 | 3.09 | — | 6.48 | 11.33 | 12.3 | 4.0 | 0.0 |
| C3 | 2-way Right Triangles | 1.5 | 1.5 | 1 | 1 | — | 7.89 | 13.81 | 14.8 | 3.5 | 1.5 |
| C4 | 1-way MD Triangles | 1.5 | 1.5 | 1 | 1 | — | 9.21 | 16.11 | 14.5 | 14.5 | 1.5 |
| C5 | 2-way MD Triangles | 1.5 | 1.5 | 1 | 1 | — | 9.78 | 17.11 | 14.5 | 15.7 | 0.3 |
| C6 | Diamonds | 2 | 1.5 | 1 | 1.5 | — | 7.64 | 13.37 | 11.4 | 3.0 | 0.0 |
| C7 | Diamonds | 2 | 1 | 1 | 1 | — | 8.14 | 14.24 | 12.7 | 3.0 | 0.0 |
| E1 | 1-way Triangles | 2 | 1 | 1 | 1 | — | 5.46 | 9.55 | 13.6 | 0.0 | 0.0 |
| E2 | 2-way Triangles | 2 | 1 | 1 | 1 | — | 5.71 | 9.98 | 14.9 | 2.0 | 0.0 |

TABLE 1-continued

Perforation Shapes, Patterns and Dimensions - Average Test Results

| Sample | Direction & Perforation type | a | b | c | d | e | MD Tensile lbs/in | MD Tensile N/cm | % Elong. | Snap Tear rows | Pinch Tear rows |
|---|---|---|---|---|---|---|---|---|---|---|---|
| E3 | 2-way Block Arrows | 2.25 | 1.5 | 0.75 | 1.5 | — | 5.86 | 10.25 | 12.4 | 0.7 | 0.3 |
| E4 | 1-way T-shapes | 2 | 1.5 | 1 | 1 | 0.5 | 6.81 | 11.91 | 16.6 | 0.0 | 0.0 |
| E5 | 2-way T-shapes | 1.5 | 1.5 | 0.5 | 1 | 0.5 | 5.93 | 10.38 | 14.7 | 1.7 | 1.2 |
| E6 | 2-way V-shapes | 2 | 1.5 | 0 | 1 | 0.3 | 2.01 | 3.52 | 7.7 | 0.3 | 0.3 |
| E7 | 2-way V-shapes | 2 | 1.5 | 1 | 1 | 0.3 | 7.27 | 12.73 | 15.2 | 0.7 | 0.7 |
| E8 | 2-way V-shapes | 2 | 1.5 | 2 | 1 | 0.3 | 9.68 | 16.94 | 17.4 | 8.7 | 0.8 |
| E9 | 2-way V-shapes | 2 | 1.5 | −0.5 | 1 | 0.3 | 0.61 | 1.06 | 3.6 | 0.3 | 1.3 |
| E10 | 2-way V-shapes | 2 | 1.5 | 1 | 2 | 0.3 | 7.26 | 12.70 | 12.7 | 0.3 | 0.5 |
| E11 | 2-way V-shapes | 2 | 1.5 | 2 | 2 | 0.3 | 9.10 | 15.93 | 13.4 | 3.8 | 0.7 |
| E12 | 1-way V-shapes | 2 | 1.5 | 2 | 2 | 0.3 | 8.83 | 15.45 | 12.5 | 1.3 | 0.0 |
| E13 | 2 way V-shapes | 2 | 1.5 | 3 | 3 | 0.3 | 9.69 | 16.96 | 11.9 | 3.7 | 1.0 |
| E14 | 1-way V-shapes | 2 | 1.5 | 3 | 3 | 0.3 | 9.77 | 17.09 | 11.4 | 1.7 | 0.2 |
| E15 | 2-way V-shapes | 1.5 | 1.5 | 0 | 1 | 0.3 | 3.70 | 6.47 | 13.0 | 0.3 | 0.8 |
| E16 | 1-way V-shapes | 1.5 | 1.5 | 0 | 1 | 0.3 | 3.69 | 6.45 | 11.5 | 0.0 | 0.0 |
| E17 | 2-way V-shapes | 4 | 2 | 0 | 1 | 0.3 | 1.72 | 3.02 | 12.1 | 0.3 | 0.3 |
| E18 | 2-way V-shapes | 2 | 1.5 | 1 | 1 | 0.5 | 7.05 | 12.34 | 15.5 | 0.7 | 0.2 |
| E19 | 1-way V-shapes | 2 | 1.5 | 1 | 1 | 0.5 | 7.11 | 12.45 | 14.4 | 0.7 | 0.0 |
| E20 | 2-way Y-shapes | 2 | 1.5 | 0 | 1 | 0.3 | 2.73 | 4.77 | 9.7 | 0.7 | 0.8 |
| E21 | 2-way Y-shapes | 4 | 2 | 1 | 1 | 0.3 | 4.03 | 7.04 | 12.1 | 0.7 | 0.7 |
| E22 | 2-way Y-shapes | 2 | 1.5 | 1 | 1 | 0.3 | 6.50 | 11.38 | 13.8 | 1.0 | 0.3 |
| E23 | 1-way Y-shapes | 2 | 1.5 | 1 | 1 | 0.3 | 7.06 | 12.35 | 13.5 | 0.3 | 0.0 |

Table 1 shows that the polymeric films of the present invention are hand tearable. Additionally, some embodiments of the polymeric film of the present invention work as well or better than comparative examples.

Comparative Examples C8 and C9

Comparative Examples C8 and C9 were films prepared in the same manner as Comparative Examples C1 and C2, respectively with the addition of a colored, polypropylene top layer to the perforated BOPP film. The top layer was produced by a conventional hotmelt coating technique with the formulation of 92 wt. % of Dow 7C05N polypropylene resin (available from Dow Plastics of Midland, Mich.) and 8 wt. % of blue-colored pigment (available from Penn Color Inc. of Doylestown, Pa.) dispersion in polypropylene. Thickness of the top layer was 45 micrometers (1.8 mil).

Examples E24 and E25

Examples E24 and E25 were films prepared in the same manner as Examples E1 and E2, respectively with the addition of a colored, polypropylene top layer to the perforated BOPP film. The top layer was produced by a conventional hotmelt coating technique in the same manner as described with Comparative Examples C8 and C9, above.

TABLE 2

| Example | Direction & Perforation type | Snap tear ave. distance mm | Snap tear max distance mm | Ave. MD Tensile lbs/in. | Ave. MD Tensile N/cm | % Elong. ave. |
|---|---|---|---|---|---|---|
| C8 | Ovals at 45° | 6.4 | 12.5 | 13.9 | 24.3 | 22.3 |
| C9 | horizontal ovals | 6.7 | 11.1 | 13.1 | 23.0 | 14.1 |
| E24 | 1-way Triangles | 0.4 | 1.0 | 11.5 | 20.1 | 16.6 |
| E25 | 2-way Triangles | 3.1 | 7.9 | 10.7 | 18.8 | 17.2 |

TABLE 3

| Example | Direction & Perforation type | Ave. TEA* N/cm | Ave. TEA* lbs/in | Ave. total tear energy cm-kg | Ave. total tear energy cm-N | Max. load peak force lbs | Max. load peak force N |
|---|---|---|---|---|---|---|---|
| C8 | Ovals at 45° | 5.70 | 3.26 | 1.87 | 18.39 | 1.50 | 6.7 |
| C9 | Horizontal ovals | 4.08 | 2.33 | 1.34 | 13.17 | 0.75 | 3.3 |
| 24 | 1-way Triangles | 2.87 | 1.64 | 0.94 | 9.25 | 0.65 | 2.9 |
| 25 | 2-way Triangles | 3.71 | 2.12 | 1.22 | 11.98 | 0.89 | 3.9 |

*TEA = total energy absorption

Comparative Example C10

Comparative Example C10 was flame-perforated BOPP film with horizontally aligned perforations and an additional top layer. Comparative Example C10 was prepared in the same manner as Comparative C9, above, with the exception that a flame perforation technique was employed as a substitution for the infrared perforation technique. The details of the flame perforation are described in U.S. patent application Ser. No. 10/267,538, filed Oct. 9, 2002, entitled "An Apparatus for Flame-Perforating Films and Methods of Flame-Perforating Films."

Examples E26 and E27

Examples E26 and E27 were films prepared in the same manner as Examples E24 and E25, respectively with the exception that a flame perforation technique was employed as a substitution for the infrared perforation technique. The details of the flame perforation are described in U.S. patent application Ser. No. 10/267,538, filed Oct. 9, 2002, entitled "An Apparatus for Flame-Perforating Films and Methods of Flame-Perforating Films."

TABLE 4

| Example | Machine Direction | | | Transverse Direction | | | Snap Tear |
|---|---|---|---|---|---|---|---|
| | Ave. Tensile lbs/in. | Ave. Tensile N/cm | % Elong. | Ave. Tensile lbs/in. | Ave. Tensile N/cm | % Elong. | Ave. Distance mm |
| C10 (Horizontal Ovals) | 20.1 | 35.2 | 25.7 | 33.6 | 58.7 | 100.0 | 6.8 |
| E26 (1-way Triangles) | 15.3 | 26.8 | 31.9 | 19.7 | 34.4 | 47.5 | 1.7 |
| E27 (2-way Triangles) | 14.9 | 26.1 | 33.3 | 20.0 | 35.0 | 50.8 | 1.5 |

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An adhesive tape comprising:
   an oriented web of polymeric film defining first and second opposed major surfaces and a plurality of open areas extending through the first and second major surfaces aligned along a tear path, each open area aligned symmetrically relative to the tear path, each open area defining:
   a boundary including a raised ridge, a narrow end opposite a wide end and a center,
   wherein the open area is continuous in transverse cross-section between the center and the wide end in a plane perpendicular to the tear path; and
   a layer of adhesive coated on at least one of the first and second major surfaces.

2. The polymeric film according to claim 1, wherein the desired tear path is a substantially straight line or row of perforations.

3. The polymeric film according to claim 1, wherein the desired tear path is perpendicular to a side edge of the film.

4. The polymeric film according to claim 1, wherein the distance between adjacent perforations in the same desired tear path is less than or equal to the length of the perforations.

5. The polymeric film according to claim 1, wherein the film comprises at least two or more desired tear paths of perforations.

6. The polymeric film according to claim 5, further comprising a gap between different adjacent desired tear paths, wherein the gap is greater than or equal to distance between adjacent perforations within the same tear path.

7. The polymeric film according to claim 6, further comprising a gap between different adjacent tear paths, wherein the gap is less than or equal to the width of the perforations at the wide end.

8. The polymeric film according to claim 1, wherein the distance between the narrow end of a first perforation and the wide end of a second adjacent perforation in the same desired tear path is less than or equal to the width of the wide end of the second perforation.

9. The polymeric film according to claim 1, wherein the perforations have a length greater than or equal to their width at the wide end.

10. The polymeric film according to claim 1, wherein the perforations have a length less than or equal to their width at the wide end.

11. The polymeric film of claim 1, wherein the raised ridge is substantially continuous.

12. The polymeric film according to claim 1, wherein the perforations have a length greater than or equal to the distance between the narrow end of a first perforation and the wide end of a second adjacent perforation in the same desired tear path.

13. The polymeric film according to claim 1, wherein the polymeric film is hand tearable along the desired tear path.

14. The polymeric film according to claim 5, wherein the polymeric film is hand tearable in two or more desired tear paths.

15. The polymeric film according to claim 1, wherein the polymeric film has a tensile strength in a direction perpendicular to the desired tear path, which is greater that 3.6 N/cm.

16. The polymeric film according to claim 1, wherein the perforations have a triangular shape.

17. The polymeric film according to claim 1, wherein the polymeric film comprises biaxially oriented polypropylene.

18. The polymeric film according to claim 1, wherein the polymeric film comprises biaxially oriented polypropylene, which has been stretched to substantially equal draw ratios in the machine direction and the transverse direction.

19. The polymeric film according to claim 1, wherein the polymeric film comprises polyester.

20. The composite polymeric film according to claim 1, wherein the polymeric film comprises polyethylene terephthalate.

21. The polymeric film according to claim 1, wherein the polymeric film represents a first polymeric film; further comprising a second polymeric fun secured to either the first or second surface of the first polymeric film and substantially covering the perforations in the first polymeric film.

22. The polymeric film according to claim 21, wherein a first polymer layer comprises polypropylene and a second polymer layer comprises a polyethylene.

23. The polymeric film according to claim 1, wherein the raised ridge around each perforation is of substantially uniform thickness.

24. A method of making a polymeric film, the method comprising:
   (a) providing an oriented polymeric film;
   (b) perforating the oriented polymeric film to form a plurality of perforations in the oriented polymeric film extending through first and second surfaces, said perforations arranged in a desired tear path; each perforation defining:
      a boundary including a raised ridge and a narrow end opposite a wide end,
      wherein a transverse cross-section taken between a center and the wide end of the perforation in a plane perpendicular to the tear path intersects the boundary at only two points;
   wherein the desired tear path extends through a central portion of the wide end and through the narrow end of each perforation, to the wide end of an adjacent perforation along the desired tear path; and
   wherein each perforation is aligned symmetrically along the desired tear path.

25. The method according to claim 24, further comprising applying a second polymeric film secured to either the first or second surface of the first polymeric film and substantially covering the perforations in the first polymeric film.

26. The method according to claim 24, further comprising applying a pressure sensitive adhesive layer to either the first or second surface of the polymeric film.

27. The method according to claim 24, wherein the polymer film is biaxially oriented.

28. The method according to claim 24, wherein the polymer film is perforated with a flame.

29. The method according to claim 25, wherein the second polymeric composition is extrusion coated onto the first polymeric composition.

30. The method according to claim 25, wherein the second polymeric composition is laminated onto the first polymeric composition.

31. An adhesive tape comprising:
   an oriented web of polymeric film defining first and second opposed major surfaces and a plurality of open areas extending through the first and second major surfaces aligned along a tear path, each open area aligned symmetrically relative to the tear path, each open area defining:
      a boundary including a raised ridge, a narrow end opposite a wide end,
      wherein the open area is continuous in transverse cross-section adjacent the wide end in a plane perpendicular to the tear path; and
   a layer of adhesive coated on at least one of the first and second major surfaces.

* * * * *

UNITED STATES PATENT AND TRADEMARK OFFICE
CERTIFICATE OF CORRECTION

PATENT NO. : 7,138,169 B2 Page 1 of 1
APPLICATION NO. : 10/382147
DATED : November 21, 2006
INVENTOR(S) : Ko Shiota It is certified that error appears in the above-identified patent and that said Letters Patent is hereby corrected as shown below:

Column 15
Line 9, Delete "hold-point" and insert -- hold-down point --, therefor.

Column 23
Line 8, In Claim 21, delete "fun" and insert -- film --, therefor.

Signed and Sealed this

Twentieth Day of February, 2007

JON W. DUDAS
*Director of the United States Patent and Trademark Office*